United States Patent
Reardon

(12) 
(10) Patent No.: US 6,212,635 B1
(45) Date of Patent: Apr. 3, 2001

(54) NETWORK SECURITY SYSTEM ALLOWING ACCESS AND MODIFICATION TO A SECURITY SUBSYSTEM AFTER INITIAL INSTALLATION WHEN A MASTER TOKEN IS IN PLACE

(76) Inventor: David C. Reardon, 73 Silver Rod Dr., Springfield, IL (US) 62707

( * ) Notice: Subject to any disclaimer, the term of this patent is extended or adjusted under 35 U.S.C. 154(b) by 0 days.

(21) Appl. No.: 09/115,185

(22) Filed: Jul. 14, 1998

Related U.S. Application Data

(60) Provisional application No. 60/053,122, filed on Jul. 18, 1997.

(51) Int. Cl.[7] ..................................................... G06F 12/14
(52) U.S. Cl. ........................... 713/165; 713/185; 713/192; 713/201; 711/164; 711/153; 705/76; 705/56; 380/30
(58) Field of Search ..................... 709/223; 713/160–169, 713/201, 192, 158, 187; 380/30; 705/62; 711/164

(56) References Cited

U.S. PATENT DOCUMENTS

| | | | |
|---|---|---|---|
| 4,405,829 | * | 9/1983 | Rivest et al. ............................ 380/30 |
| 4,757,533 | * | 7/1988 | Allen et al. ............................ 713/192 |
| 4,757,534 | * | 7/1988 | Matyas et al. ......................... 705/56 |
| 5,144,659 | | 9/1992 | Jones ........................................ 380/4 |
| 5,201,000 | * | 4/1993 | Matyas et al. ......................... 380/30 |
| 5,289,540 | * | 2/1994 | Jones ..................................... 713/165 |
| 5,434,562 | | 7/1995 | Reardon .......................... 340/825.34 |
| 5,485,519 | * | 1/1996 | Weiss ................................... 713/185 |
| 5,533,123 | | 7/1996 | Force et al. ............................. 380/4 |
| 5,548,721 | * | 8/1996 | Denslaw ............................... 713/201 |
| 5,623,637 | * | 4/1997 | Jones et al. ........................... 711/164 |
| 5,657,470 | * | 8/1997 | Fisherman et al. ................... 711/153 |
| 5,710,817 | * | 1/1998 | Sjooquist ............................... 380/30 |
| 5,757,920 | * | 5/1998 | Misra et al. .......................... 713/158 |
| 5,799,086 | * | 8/1998 | Sudia ..................................... 705/76 |
| 5,844,986 | * | 12/1998 | Davis ................................... 713/187 |
| 5,956,406 | * | 9/1999 | Maldy ................................... 380/30 |
| 5,982,896 | * | 11/1999 | Cordery et al. ........................ 705/62 |

* cited by examiner

Primary Examiner—Meng-Al T. An
Assistant Examiner—Wen-Tai Lin
(74) Attorney, Agent, or Firm—John J. Goodwin; Albert W. Hilburger

(57) ABSTRACT

Apparatus and process are disclosed by which to disable a computer's access to all or a part of the computer's memory system or associated peripherals, so as to protect the computer from accidental or malicious damage of data files or programs that may result from the activity of computer users or computer viruses. This result is achieved by providing the authorized user with a token whereby the user can configure the security gateway to completely or partially disable the peripheral device without disrupting the operation of the computer or other peripherals. The principal hardware component of one embodiment of the invention is the security gateway which in a typical configuration simply adds new security functions to the programmable controllers that are typically used for an I/O controller or hard drive controller, although this is not always necessary. The process can just as easily be incorporated into a local network controller, a communications controller, or a main processor board for a system. The speed of the security gateway can be further enhanced by adding additional computational or encryption hardware to the chip sets used in said I/O or hard drive controllers.

23 Claims, 1 Drawing Sheet

NETWORK SECURITY SYSTEM ALLOWING ACCESS AND MODIFICATION TO A SECURITY SUBSYSTEM AFTER INITIAL INSTALLATION WHEN A MASTER TOKEN IS IN PLACE

CLAIM OF PRIORITY BASED ON CO-PENDING PROVISIONAL APPLICATION

The present application is related to co-pending Provisional Patent Application Ser. No. 60/053,122 filed Jul. 18, 1997 entitled "COMPUTER AND NETWORK SECURITY SYSTEM", and based on which priority is herewith claimed under 35 U.S.C. §119(e) and the disclosure of which is incorporated herein by reference in its entirety. Likewise, the disclosure of Disclosure Document 422490 filed Aug. 11, 1997 is also incorporated herein by reference in its entirety.

BACKGROUND OF THE INVENTION

1. Field of the Invention

This invention relates to apparatus and methods for computer security and to the prevention of unauthorized reading or altering of computer data by individuals or programs operating on a computer or a computer network.

2. Description of the Prior Art

This invention addresses two major areas of computer security for both individual computers and networked computer systems: (1) protection of programs and data at the place where they are stored, and (2) secure exchange of data and programs between computers and computer users.

Protecting computer data and programs from unauthorized copying, destruction, or alteration is a major concern for governmental agencies, businesses, educational institutions, and individual users. In addition to protecting valuable data from spies or malicious programmers, there is a need to protect data from computer "virus" programs which can infect a system and cause damage at some later date. Numerous computer security programs have been written to provide a large variety of features to protect computer data. These include such features as password protection, restricted access to specified files, limited menu options, checksum verification, and scanning for known virus programs or virus-like activities. The major shortcoming of these computer security programs is that they must operate within the computer's working memory space, its RAM. This means the security software is susceptible to other forms of software which can defeat the program's security measures.

Software protection of computer data can be enhanced by the use of specialized computer hardware that provides additional security functions. In U.S. Pat. Nos. 5,144,659 and 5,289,540, Jones teaches a security method wherein a hard drive controller provides extra security functions. In U.S. Pat. No. 5,434,562, Reardon teaches the use of CPU-independent, user activated key lock switches by which an CPU-independent security controller can be configured and reprogrammed in a secure fashion. These inventions illustrate a method of enhancing security by making some security functions independent of the CPU. In Reardon's invention, these hardware secured parameters require a user to insert and activate a CPU independent hardware switch to change or alter the security parameters. Since this switch is CPU independent, it is impossible for this hardware security device to be bypassed or defeated by software or keyboard programming.

The second major area of concern in the field of computer security revolves around the area of secure communication in the exchange of data. This field of security requires an ability to encrypt data, to limit access to intended persons, to verify the accuracy of transmissions, and to verify the identity of the sender. One popular technique employs the use of asynchronous encryption keys. This technique is based on the use of public/private key-pair encryption system wherein two binary strings (one serving as a "public key" and the other as a "private key") are used to encrypt and decrypt data. Anything encrypted with one key can only be decrypted by the other. The public key is "published" or at least accessible to intended recipients of data. The private key is never revealed but is held only by owner of that key. To send a private message, the sender encrypts a message using the receiver's public key. Since only the receiver possesses the matching private key, only the receiver can decrypt the message.

To send proof of one's identity, the sender encrypts a message using his own private key. This message can only be decrypted using the sender's public key. Thus, any receiver who has access to the public key can verify that the message was sent by the person who possesses the matching private key. In this way, the receiver can use non-confidential information, the public key, to verify that the sender possesses the corresponding private key, thus confirming the identity of the sender as that corresponding to public key.

Many additional cryptographic techniques, well known in the art, can be used to enhance this general scheme. For example, proof of the identity of the party associated with a public key can be certified by a private or governmental authority who issues said party a an electronic "Digital Certificate." Also, the integrity of data transmissions can be verified by the use of "hashing" formulae that create a short message digest similar to a check sum. In these ways, for example, financial transactions and the like can be electronically, securely, and and privately transmitted to the intended party (using the receiver's public key), including a digital signature (using the sender's private key), verification of the sender's of identity (using a Digital Certificate), and verification of the message content (using the hashed message digest). To guard against the accidental loss of a private key, or to recover corporate data in the event of a key owners death or disability, private keys can be split into multiple parts that are placed in "escrow" with two or more separate parties. In the event of loss or disability, the escrow agents can provide to the authorized receiver their escrowed portions of the key so that it can be reassembled and used to recover files encrypted with its associated public key. These and other encryption techniques, known to those skilled in the art, can be implemented with the present invention.

The use of asynchronous keys, or public/private key pairs, has been further enhanced by the use of portable electronic devices, often referred to as "tokens," that store the asynchronous key in electronic memory and protect it from unauthorized use by means of a personal identification number (PIN). Tokens may include both memory for storage of keys and encryption processors for encrypting data. These technologies make the private portion of the asynchronous key pair more secure because it does not reside on the computer where the data is created. In addition, the token can be easily transported, like an ID card. The "key" to the data can therefore be stored away from the data, thus enhancing security. To access files encrypted using the owner's public key, a corporate spy would need to (1) gain access to the encrypted files, (2) find and steal the token and (3) discover the owner's PIN which makes the token functional.

One disadvantage of the encryption tokens described above is that they are relatively expensive because of the substantial electronics required for each token. In addition, while these tokens provide excellent security in the exchange of data, they cannot directly protect the storage area where the data is stored from being erased or altered by computer viruses or sabotage.

It was with knowledge of the foregoing disclosures representative of the state of the art that the present invention was conceived and has now been reduced to practice.

SUMMARY OF THE INVENTION

This invention describes a means and process by which to disable a computer's access to all or part of the computer's memory system or associated peripherals, so as to protect the computer from accidental or malicious damage of data files or programs that may result from the activity of computer users or computer viruses. This result is achieved by providing the authorized user with a token whereby the user can configure the security gateway to completely or partially disable the peripheral device without disrupting the operation of the computer or other peripherals.

The present invention has hardware and software elements that are well known and utilized in the field of computers and computer security. The present invention, however, combines these elements in a novel manner unlike any other system known to produce useful benefits, increased security, and reduced costs of manufacture.

The principle hardware component of one embodiment of the invention is the security gateway, which in a typical configuration simply adds new security functions to the programmable controllers that are typically used for an I/O controller or hard drive controller, although this is not always necessary. The process can just as easily be incorporated into a local network controller, a communications controller, or a main processor board for a system. The speed of the security gateway can be further enhanced by adding additional computational or encryption hardware to the chip sets used in said I/O or hard drive controllers.

With regard to the software elements of this invention, computer programmers will immediately recognize many ways to implement security software that can employ the features of the configuration switch disclosed in this invention. Commercial security programs that allow user configuration, but lack a hardware security gateway and token based configuration include Protec by Sophco, Totalsafe by EliaShim, and Cetus by Foundation Ware. U.S. Pat. No. 5,144,659 to Jones discloses a detailed flowchart for software configuration of a CPU-independent, programmable security device for hard drives, though the Jones invention lacks the user accessible configuration switch of the present invention and the use of a token as described herein.

The present invention provides a security gateway that operates by intercepting the system data path, address bus, and control logic signals between the CPU and peripherals, such as hard drives and network communication cards. The requested operation is processed according to the criteria established by the security gateway's preprogrammed security parameters. These security parameters may be unique for each individual using the computer or computer network. The security gateway generates a unique asynchronous key pair for each user and creates a token containing the private key for that particular user that is encrypted with the security gateway's own public key making the token readable only by the security gateway. More complicated techniques are also disclosed for creating a token that can be used throughout a computer network.

The appropriate security parameters and access rights are assigned to new users by the appropriate supervisory and/or security personnel and are associated with the token that is issued to the new user. Assignments of rights, or modification of rights, can only take place after the identities of said supervisory and/or security personnel have confirmed by the security gateway's examination of their own tokens and only under such additional conditions that may previously have been defined.

After the security gateway has read a token, confirmed a user's PIN number, and determined the user's rights, the security gateway will refuse to allow the user any access to any restricted peripherals or portions of said peripherals. Otherwise, the security gateway will be "transparent" to the user and computer system.

In addition, the security gateway can monitor a computer system's initialization process and monitor the integrity of any CPU based security software. Furthermore, the security gateway's tokens can be used for all the functions of secure data communications that are commonly used in public key cryptography. It should be noted that while the encryption and decryption of the U.X key stored on the token must be performed by the security gateway itself, when using the token for secured communications, the main message could be encrypted by the CPU using any of many encryption techniques. Only the message encryption key would need to be encrypted by the security gateway using U.XR (see definitions to follow). This point is important because the packets of information that must be encrypted or decrypted by the security processor would normally be relatively small. In most applications, the larger files could be encrypted using the greater processing power of the CPU.

Furthermore, the security gateway of the present invention can monitor the integrity of program files and implement a single site licensing protocol that can prevent the transfer and use of licensed software to other computer systems or limit the use of software to a specific period of time or number of trials.

A distinct advantage of the present invention over the prior art is that it combines the data security features with modern encryption techniques in a way that produces new and unexpected advantages in terms of both cost and functionality. This invention improves on techniques previously disclosed by Reardon in U.S. Pat. No. 5,434,562 by eliminating additional manufacturing costs, provides greater flexibility for third party software developers, and a provides a means for generating unique asynchronous key pairs for the authentication of an individual user's identity, secure data transmission, and rights access.

An object of the present invention is to provide apparatus and methods by means of which the authorized user of a computer can protect data and programs stored in peripheral devices, such as mass storage media, from alteration or deletion by malicious persons, or computer "virus" programs, or accidents initiated by unskilled persons. Another object of the present invention is to provide a means and method for verification of identity of users and encryption and authentication of data transfers.

This invention is particularly useful in multi-user environments. This invention is also useful for persons who desire to evaluate new software but are afraid that by doing so will they will be exposing their computer system to infection with a computer virus. By locking out write access to their computer's hard drive, the system is "safe" and the suspect program can be run without risk of it causing an infection which may later cause loss or disruption of programs and data.

By providing complete user control over a computer's access to its peripheral devices, this invention allows the user to implement greater security precautions against unauthorized programs or users. These options include limiting read and write access to the peripheral device, and the ability to configure the peripheral device so as to make all or portions of the device appear to the computer as a read-only, write-only, or write-once peripheral device.

A further object of the present invention is to provide computer security apparatus and methods wherein tokens can be easily and inexpensively created and issued to as many users as desired with customized rights for each user.

Still another object of the present invention is to provide a computer security apparatus and methods wherein tokens can be restricted for use at a single computer or configured to operate on selected computers within a network.

A still further object of the present invention is to provide a computer security apparatus and methods wherein modifications to rights and restrictions can be implemented offsite by a security supervisor under more secure conditions and wherein a security gateway can be easily programmed to block the installation or use of programs that are not approved for use on a computer system or computer network.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
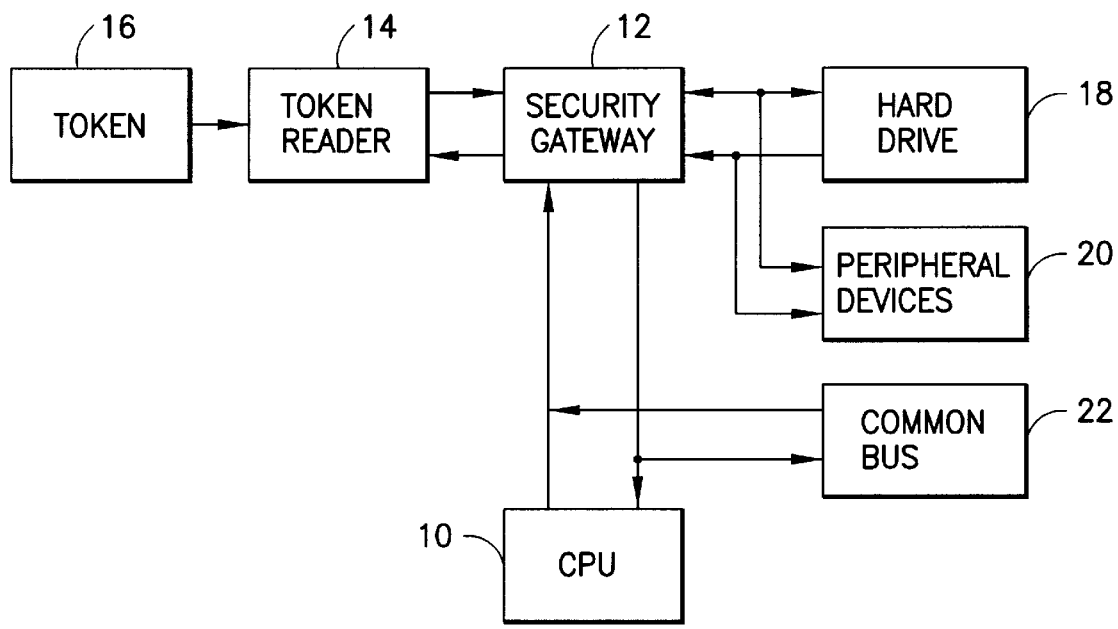
FIG. 1 is a schematic block drawing of a computer system according to the principles of the present invention that illustrates the relationship between the CPU, the security gateway, the token reader, and peripheral devices that may be subject to security restrictions implemented by the security gateway.

In the ensuing description of the present invention, the following definitions will be utilized:

Block Encryption: An encryption method that uses a single key for both encryption and decryption and that encrypts groups of bits rather than a single bit at a time.

Bus or "host computer bus": The electronic paths within the host computer that carry address, control, and data signals. As used herein, the term "bus" should be considered to also include any alternate means of data interface with the CPU and other internal or external devices. A fiber optic system could be one such alternative.

Computer virus: Any potentially destructive computer program that may cause malfunction of the computer, corruption of files, loss of data, or other unwanted and unexpected results.

CPU: The Central Processing Unit (CPU) is one or more computer programmable devices that serve as the primary processing center for computer implementation of program instructions, computation, and transfer of information.

CPU Security Program: Program and associated files that are implemented by the CPU to monitor system security, and enforce security restrictions for the system or individual users.

Digital Certificate: A binary information file that can be verified as issued by a trusted authority by use of the certifying authority's public key where the certifying authority vouches for some or all of the information contained in the Digital Certificate. Typically, a Digital Certificates may in fact include several layers of Digital Certificates, each layer vouching for the layer beneath it. This is known as a Certification Hierarchy. For example, at the highest level the U.S. Post Master's public key is used verify that the enclosed Digital Certificate #2 was issued to the local Metropolis post office. The public key of the Metropolis post office is used to certify that the Metropolis post-master issued the enclosed Digital Certificate #3 to the ABC corporation. The public key of the ABC corporation's is used to certify that the ABC corporation issued Digital Certificate #4 to John Doe in ABC's accounting department. Each certificate would contain information about the public key and identity to whom the certificate was issue, a certificate serial number, certificate validity dates, and the certifying authorities I.D. information and digital signature, and any additional information as may be required. All of the Digital Certificates described in the above example can be contained in a single Digital Certificate that is sent to Bill Smith of XYZ, Inc. By examining these Digital Certificates, Bill Smith can now evaluate the certainty of John Doe's identity based on the his trust in the hierarchy of certifying authorities. Thereafter, the Bill Smith can use John Doe's public key to privately and securely communicate with John Doe using the widely known methods of public key cryptography.

Gateway Program: A program and associated files that are implemented by the security gateway to monitor system security, and enforce security restrictions for the system or individual users.

Key Pair: A complimentary pair of encryption keys whereby a message encrypted with one part can only be decrypted by the other part. This is also known by those in the art as an asynchronous key pair or as a public key cryptography.

Non-volatile memory: Memory locations that preserve their stored information even when power has been removed from the memory banks and/or computer system. Typical examples of non-volatile memory include ROM, EEPROM, Flash memory devices, and magnetic storage media.

PIN: Personal Identification Number. This can be any password associated with the user of a token to prevent the token's unauthorized use by a person who does not know the PIN.

Private Key: The part of a key pair that is reserved by the "owner" of the key pair and not disclosed to any other party.

Public Key: The part of a key pair that is shared with parties with whom the owner desires to exchange files.

Restricted Memory: Non-volatile memory which is accessible only to the security gateway. This may include reserved sectors of the hard drive and tokens to which the GATEWAY PROGRAM will never allow access requests from the CPU. For backup purposes, restricted memory can be encrypted using SG.0R prior to transfer to backup media.

Security gateway: A programmable device that is independent of the CPU and situated in such manner as to be able to control or block the CPU's access to secured peripherals such as mass memory storage devices, network communications devices, and the token reader. This device would include sufficient nonvolatile memory and random access memory for implementation of its functions.

Shell: A security program consisting of two parts, a CPU Security Program and a Gateway Program, wherein each part works with the other to enhance the total system security.

SSL: Single Site Licensing protocol used to prevent unauthorized use or duplication of software or data.

Token: A removable memory device capable of storing one or more encryption keys. This token may be as simple as a magnetic strip or as complex as a PCMCIA card.

Token Reader: An input device by which means the security gateway can read the information encoded on a token.

Definition of Key Names:

In the specification that follows abbreviations are used to specify particular key pairs and, when appropriate, the token associated with the private portion of the key pair. The SG prefix refers to a Security Gateway related key. The U prefix refers to a key that is assigned to an individual user, and SSL refers to a key that is issued to parties in a single site licensing of software. The prefix CA is used by a Certifying Authority that issues a Digital Certificate. Since multiple keys may be involved for each party, each prefix is follow by a decimal point and a number identifying which key pair is being referred to, and either the letter R or B where R refers to the private portion of an asynchronous key pair and B identifies the public portion of the key pair.

AK.1—A key pair used by a certifying authority to assist in anonymous but traceable transactions wherein the anonymous user's identity and Digital Certificate is sealed with AK.1B. AK.1R is divided and placed in escrow so the anonymous users Digital Certificate and identity can be recovered, with proper authorization such as a court order, in the event there is a subsequent criminal investigation or civil dispute.

CA.1—A key pair used by a Certifying Authority to verify that some or all of the information contained in a Digital Certificate encrypted with CA.1R has been verified the Certifying Authority.

CS.1—The security gateway key pair of the central server of a computer network.

SG.0—A key pair belonging to the security gateway manufacturer. SG.0B is factory installed into the security gateway. This allows for authentication of manufacturer upgrades of the security gateway's and SSL standards. The upgrade may include the issuing of a new public key for the manufacturer. For authentication purposes, the upgrade must by verifiable by including one or more files encrypted with SG.0R.

SG.1—The security gateway's own key pair, generated upon activation of the security subsystem functions. This key may be generated using site specific "seed numbers." A corresponding Digital Certificate may include user ID and site identification information.

SG.X—The security gateway key pair of computer other than the one that created a particular token where X is a number identifying the security gateway and host computer.

SSL.1—A file on the original diskette of an SSL protected program or data set. This file contains the SSL protected program's Digital Certificate, including a "marriage" history, and the file is flagged in a manner such that the security gateway will not allow it to be copied to any other media.

SSL.2—A copy of SSL.1 which is embedded in the software and can be freely copied with the program to the hard drive or backup diskettes.

U.0—The master configuration key for the security gateway held by User 0, where User 0 is the person chiefly responsible for configuring the computer's security. In addition to any other necessary information, U.0R is stored on the MASTER TOKEN in a file encrypted with SG.1B. U.0B may be stored on the hard drive or even made available on a network if the MASTER TOKEN is intended to be used at other sites.

U.1—A security gateway configuration key used for on-site confirmation of a network issued upgrade of the Security gateway security parameters. U.1R is stored on the on-site diskette in a file encrypted with SG.1B.

U.X—A key for individual user number X. A U.X diskette contains a file which is encrypted with SG.1B that contains U.XR and any additional security information such as rights, passwords, and a Digital Certificate associated with the individual user.

Returning now to FIG. 1 which illustrates in a broad sense one embodiment of a computer system according to the present invention. In the following description of the FIG. 1 embodiment, file control functions will be discussed, and such basic control functions are described in U.S. Pat. No. 5,289,540 to Jones.

Because they are so well known and in such common use, the description of this invention will be based on the use of a personal computer (PC) using on operating system such as Windows 95 or MS-DOS. However, it should be understood that this is done for the sake of convenience and simplicity of description and the invention should not be considered as limited to these or any other operating system or computer equipment.

The system of FIG. 1 includes a control processing unit (CPU) 10, a security gateway 12, a token reader 14 for reading a user token 16, a hard drive memory 18, protected peripheral devices 20 such as network communications, and a common bus 22 for peripheral devices.

Figure 2:
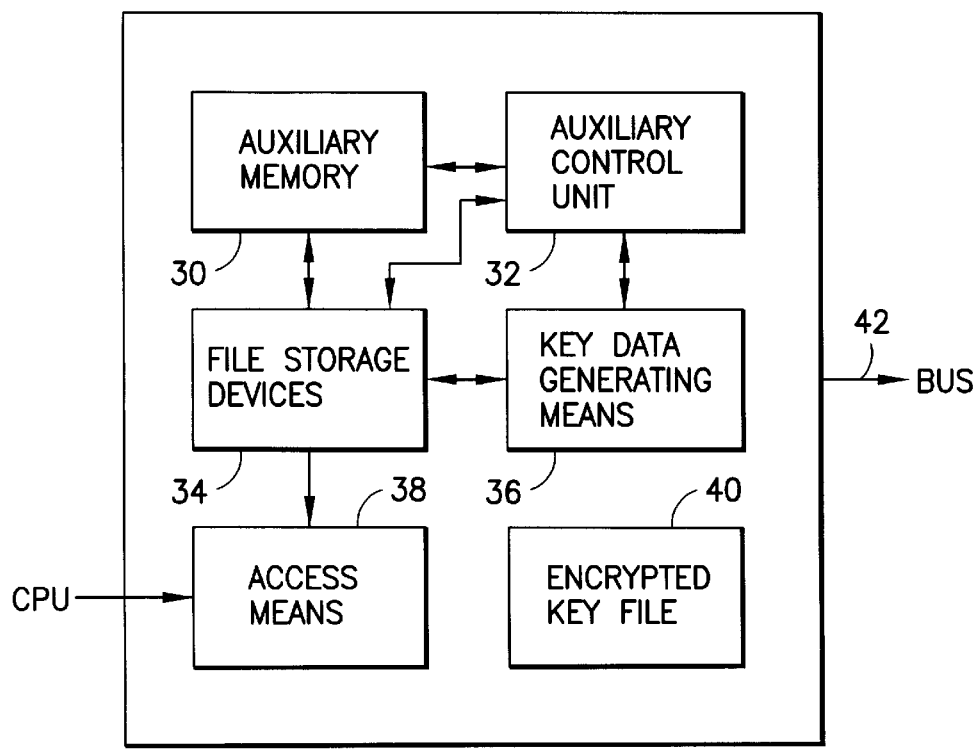
FIG. 2 is a functional block diagram illustrating the elements of a security subsystem for the present invention.

FIG. 2 shows the functional elements of a security subsystem including a programmable auxiliary memory 30 and auxiliary control unit 32; file storage devices 34 for storing files, with at least one of the storage devices capable of reading and writing to removable storage media; means 42 for attaching the security subsystem to the digital computer bus; means 36 for generating private/public key pair data and storing the private key data in a file location of the file storage devices 34 which is under the control of the security subsystem auxiliary control unit 32 and to which access by central processing unit 10 of the digital computer can be denied; means 40 for using the public key to create an encrypted key file which is written to a removable token, such that the encrypted key file can only be decrypted and authenticated by the security subsystem using the corresponding private key of the private/public key pair; means 38 for permitting access to the security subsystem by the computer operating system for installation and modification of security requirements only when the removable token is placed into the appropriate file storage device and has been authenticated by the security subsystem; and by a combination of these means requiring the security subsystem to deny file storage device and peripheral device access requests by the central processing unit when the security requirements are not satisfied.

It should be noted that in the interest of speed, much of the encrypting can be performed using a faster shared key algorithm (such as a Data Encryption Standard (DES) key) if the shared key is itself encrypted using the appropriate public or private key. The public or private keys, therefore, merely serve as an authentication barrier to access of the shared key. The shared key, of course, can be uniquely generated for each transaction.

In the embodiment of FIG. 1, the functions of the security gateway 12 may be integrated into a hard drive and floppy diskette controller. Because most hard drive controllers already use a programmable processor to implement various functions, in many cases the functions of security gateway 12 could be added as additional subroutines in the firmware of the controller without substantial hardware modification. However, because encryption algorithms may be complex, additional memory and/or logic circuitry that enhances the speed of encryption/decryption could be added, if necessary, to prevent any degradation in speed. Because the security gateway 12 has control over one or more hard drives 18, it is most cost effective to reserve space on one or more hard drives for the security gateway's own use. For all practical applications, the security gateway's ability to "leech" as much memory space as it needs off of the system's hard drive for its own purposes ensures that there is no practical memory limit on the security gateway's program size or security parameters. Because these reserved sectors are under the complete control of the security gateway 12, they would never be made accessible to the CPU 10 or the host computer's operating system. For added security, the information contained in these sectors can also be encrypted with the security gateway's own public key (SG.1B). In this event, even if the hard drive was moved to a different computer, these reserved sectors would be indecipherable to any device other than the security gateway that created them. To provide a means of recovering these files in the event of a hardware failure, the public key could be divided and placed in escrow with trusted authorities. For the sake of convenience, the security gateway's reserved sectors of hard drive space will be designated with negative numbers.

In this typical example, upon the powering up of the computer system the security gateway, 12, would reads its own factory installed GATEWAY PROGRAM from non-volatile memory. It might also check for extensions to its GATEWAY PROGRAM on, for example, sectors −1 through −5 of the hard drive.

The GATEWAY PROGRAM and any extensions that may be installed contain the instructions and security parameters that control the security related activities of the security gateway. The GATEWAY PROGRAM can be either very simple or very complex, depending upon the needs of users and the marketing goals of manufacturers and security software vendors.

The token reader 14, is read directly by the security gateway 12. In a typical configuration, the token reader could be a standard floppy diskette drive. Other devices can be used as a token reader, the only requirement being that the device must be able to read and write to a removable memory device that can serve as a token 16. Because the security gateway is interposed between the token reader and the CPU 10, information stored on the token is secure from CPU access unless such access is specifically provided for by the GATEWAY PROGRAM. In such cases, the security gateway would echo the data reads and writes from the CPU to the token reader 14.

In a typical example, a new computer system would be shipped with a rudimentary GATEWAY PROGRAM and a MASTER TOKEN that the buyer would used to customize the security features of the computer. To initialize the security gateway, 12, and setup the security parameters, the buyer or security supervisor would place the MASTER TOKEN in the token reader, 14. Optionally, the manufacturer could design the GATEWAY PROGRAM to require that the MASTER TOKEN be in place before the computer is powered up. The original manufacturer would include as part of the GATEWAY PROGRAM stored in restricted memory the key SG.0B. The MASTER TOKEN would include one or more files encrypted with SG.0R. By use of SG.0B the Gateway Program can verify that the MASTER TOKEN is indeed a token issued by the manufacturer and can be "trusted" as a secure device for initiating security software or parameter changes. It should be noted that SG.0B is never published in any public way. It would only leave the factory in firmware for a particular series of security gateway devices. SG.OP would never leave the manufacturer's premises at all, except in a divided escrowed form. As is true in many other uses of key pairs in this invention, access to both the "public" and "private" portions of the key pair is strictly protected. Under no circumstances would the GATEWAY PROGRAM ever transmit SG.OB to another device.

After determining that the MASTER KEY is in the token reader, the GATEWAY PROGRAM would scan the MASTER KEY to determine if this is a first time use of the MASTER KEY and examine the security gateway's restricted memory to determine if SG.1 had already been created. If the GATEWAY PROGRAM determines by these means that initialization program should be run, said program would be loaded into the CPU to provide a means of interaction between the user and the security gateway. To enhance the security of this process, it would be advisable not to allow any other programs to be allowed to run during any initialization or modification of security parameters. The manufacturer could enforce this provision through subroutines in the GATEWAY PROGRAM that would be immediately obvious to any computer programmer.

Upon confirmation from the user that the first time initialization should proceed, the security gateway would request the user to enter personal information, PIN numbers, and initial security preferences. If desired for the purpose of added security, the new user can also be presented with dozens of questions of a personal nature (such as the name of one's first pet). These questions can then be randomly used as a secondary check after entry of a correct PIN to further verify a user's identity. The security gateway might also request additional information about the computer configuration and computer network from the user or directly from the CPU. After enough information has been collected to construct a unique profile the security gateway would use a hash or checksum of this "random" data to create a unique seed for use in generating SG.1, a key pair that would be unique to this particular security gateway. After SG.1 has been created, the security gateway is distinct from all the other security gateway's produced by the manufacturer. Both portions of SG.1 are stored in restricted memory locations.

Using SG.1B, the security gateway creates a file that is stored, perhaps at a specific and predetermined location, on the MASTER TOKEN. This SG.1 encrypted file thereafter serves as a means of determining that the MASTER TOKEN has been configured. A PIN would be selected and encrypted and stored on the MASTER TOKEN with additional security parameters, passwords, certificates of authority, and other information that may be necessary for a particular security needs. In addition, the security gateway would also create U.0, a key pair that is assigned specifically to User 0, the owner of the MASTER TOKEN. U.0R would be stored on the MASTER TOKEN in an encrypted form using SG.1B. U.0B would be stored in a restricted area. U.0R can thereafter be used as the private key of the MASTER TOKEN holder and can be used for verification of identity, access to modification of security parameters, secured communications, and for personal file encryption.

After this first initialization, the MASTER TOKEN can be used to reconfigure security parameters or to create new tokens for one or more users with rights either equivalent to those associated with the MASTER TOKEN, or more commonly, with restricted rights. Every time the security gateway creates a new token, it would create a unique key pair U.X for the person to whom the token is issued, User X. U.XR and an associated PIN would be stored on the token in a form encrypted with SG.1B. U.XB would be stored in the security controllers restricted memory or, if desired, "published" in a file accessible to the CPU or computer network. A Digital Certificate, security parameters, and other user specific information could also be incorporated into encrypted files on the token. The specific rights and restrictions associated with each user can saved in the security gateway encrypted files on the token, in restricted memory, or, in a network application, in a restricted memory location of central server's security gateway. Once the token has been created and a PIN and rights have been assigned, User X can thereafter use it for any and all security functions, including verification of identity, identification of computer access rights, secure file communications, and personal file encryption.

In a typical application, the User X would place the token, 16, in token reader, 14. The token reader would transfer information from the token to the security gateway, 12, and verify the users identity by activating a subroutine that would allow the user to enter a PIN. After confirmation of the PIN, the security controller would determine the access rights of User X and limit the CPU's access to data and peripherals according to these assigned rights. Requests to read or write to restricted files would be denied and might also be recorded for reference by the Corporate Security Officer or trigger an alarm. The GATEWAY PROGRAM can also conceal the existence of any files or peripherals such as peripherals 18 and 20 that are "downline" from the controller and not directly on the CPU bus. By monitoring CPU bus address, data, and control signals, the security gateway can also detect if the CPU attempts any unauthorized reads or writes to peripherals on the CPU Bus, 22. While such peripherals cannot be protected in the same fashion as "down line" peripherals which have the security gateway interposed between themselves and the CPU, the security gateway can still provide some protection for "up line" peripherals. Specifically, unauthorized CPU access to "up line" peripherals or files can result in retaliatory loss of rights to "down line" peripherals, the sounding of an alarm at the computer site or to a network supervisor, or a forced shutdown of the host computer which can easily be achieved by contesting the CPU's control of the address bus and control signals, rendering them inoperative. In this manner, the security gateway is able to monitor and control User's access to all peripheral devices. Even a very skilled computer programmer could not program the CPU to get around the independently enforced security parameters that are enforced at the level of the security gateway.

As described above, this invention makes it easy to create tokens at a cost as little as the price of a single diskette. Tokens can be created for each individual and also for specific applications. For example, a corporate accountant might have two tokens. The first would be a general use token that provides him with access to all the general purpose programs he might need such as word processing and Internet access with the exception of access to the accounting books. The second token that gives him access to the accounting books might be separately stored under lock and key, thus providing an additional level of security.

To preserve against the loss or destruction of any token created by the security gateway, including the MASTER TOKEN, the GATEWAY PROGRAM may include subroutines that will take the information and keys stored on a token and divide them into multiple parts that can placed in escrow onto multiple tokens. By use of these escrow tokens, the security gateway can reconstruct lost or destroyed tokens. SG.1R may also be divided and placed into escrow to provide a means of recovery in the event the security gateway itself is rendered inoperative.

Most ideally, the security gateway would automatically sense when a token is inserted into the token reader and the security SHELL would automatically activate a window requesting the user to enter his or her PIN. Alternatively, the user can activate a program that instructs the computer to log on a new user. After confirmation of the PIN, the user could be instructed to remove the token before allowing access to ensure that user does not forget to remove the token and properly secure it. The security gateway can record multiple entries of the wrong PIN on the token and in other memory locations and either disable the token or sound an alarm if the number of attempts exceeds a predefined security limit. Additionally, the security gateway can "time out" a user who has not been active at the computer after a predefined period. These and other techniques commonly used in computer security can easily be made part of the GATEWAY PROGRAM or SHELL.

The previous discussion has described the basic steps that are always required to implement any of the security functions disclosed in this invention. Namely, (1) the security gateway must be initialized to create its own unique SG.1 key pair; (2) A user specific key pair, U.X, must be created; (3) U.XB must be stored in a restricted area or "published" in a place other than on the token; and (4) U.XR and an associated user's PIN must stored on a token, 16, in an encrypted file that can only be opened with SG.1R.

It should noted, however, that while the encrypted files on the token must be secured so that only the security gateway can open them by use of SG.1R, it is not necessary that they actually be entirely and directly encrypted with SG.1B. Greater encryption speeds can often be achieved, without loss of security, by the use of other encryption techniques. One widely used method in public key cryptography involves the creation of a "lockbox." A lockbox is a file or file segment that contains a randomly generated block-encryption key that was used to encrypt a larger data file. The lockbox is created by encrypting the block-encryption key with the private key of a key pair, in this case, SG.1B. To retrieve the information stored on the token, the security gateway would (1) open the lockbox with SG.1R and retrieve the block encryption key and (2) use the block encryption key to retrieve all the additional information stored in the user files, such as U.XR, the user's PIN, a Digital Certificate, security rights information, history of use, et cetera. The accuracy of the stored information may also be verified by the use of hashing techniques to produce a message digest that is stored on the token with the other corresponding files.

Finally, it should be noted that for backup purposes the security gateway can use SG.0R to encrypt restricted memory in reserved sections of a hard drive and transfer these encrypted files to backup media. If the security controller has direct access to the backup media, these files could also be completely concealed from the CPU and all users.

Having identified these steps that are most basic to all embodiments of this invention, it would now be instructive to examine a simple application of this invention. For this example, consider the case of a simple home environment. The parents have purchased a new computer wish, in general, to allow their children complete access to everything on the computer system. However, they would like to reserve a portion of the hard drive, or a separate logical drive, that will contain certain business programs and related files. They hope to protect these business files from accidental corruption, computer viruses that may be transmitted through borrowed software or "surfing the net" or from teenage snooping. In this simple case, it would be sufficient to have only a single user token that is in the custody of the parents. This may in fact be the factory issued MASTER TOKEN. On first use of this token, U.0 is generated and the parents select a PIN number to secure the token. To protect their business records, the parents use MASTER TOKEN to instruct the security gateway to only allow the holder of the MASTER TOKEN access to, for example, logical drive H that they are reserving for their business applications and business data. Non-token users would not even be allowed to see that drive H and its files exist, much less to access or alter them deliberately or by accident. Additionally, the parents wisely configure the security gateway to treat key programs and data files, such as those used in the operating system, as read-only. Non-token users, and any programs activated by non-token users, would not be allowed to alter or change any of these files. If desired, these files could also be hidden from directory reports to non-token users. The parent's children in this example, would be free to boot up the computer at any time and to do anything that is not restricted to non-token users. They could run programs, save files, and erase files on logical drive C, for example, but all of the business programs, business data, and protected program files would be completely protected from accidental or deliberate corruption by either computer viruses or children's accidents. In this very simplest of examples, the GATEWAY PROGRAM would do little more than enforce a table of restricted sectors on the hard drive. The children might not even be aware that the security gateway was in existence or functional. The only imposition on the users is that the parents would be required to insert the MASTER TOKEN in the disk drive and enter their PIN in order to gain access to their business applications. As will be described below, much more elaborate security hierarchies can be developed with little more imposition on users.

Upgrading the Security Shell

The security gateway can also be used to assure the integrity of security programs that are operating at the CPU or network level. In this respect, the security gateway is open, under carefully controlled circumstances, to customization. The following is a description of a typical example of the interactions between the security gateway and a CPU SECURITY PROGRAM.

In this typical example, upon the powering up of the computer system the security gateway would reads its own factory installed GATEWAY PROGRAM from nonvolatile memory. It might also check for extensions to its GATEWAY PROGRAM on, for example, sectors −1 through −5 of the hard drive. It may then check to see if there is a system security shell program (hereinafter SHELL) which has been installed, for example, in sectors −11 to −20. The SHELL itself may consist of two parts: all or portions of a security program that is to be implemented by the CPU (hereinafter the CPU SECURITY PROGRAM) and further extensions on the security gateway's own program that are provided by the CPU SECURITY PROGRAM vendor to establish additional security rules governing the interaction between the CPU SECURITY PROGRAM and the security gateway.

If a CPU SECURITY PROGRAM is in place, the security gateway could be configured to ensure that the CPU SECURITY PROGRAM is installed at the appropriate point in boot up process of the system. The SHELL could be a factory installed, or installed by the user. Let us assume that there is at least a rudimentary SHELL that is factory installed and is capable of running a simple configuration setup like that used for BIOS configurations, if only for the purpose of facilitating the installation of a vendor supplied SHELL.

The following describes one of many ways in which the security gateway could be used to install or upgrade the SHELL. To install a new security SHELL, the system must first be powered down. To ensure that the RAM is completely discharged, a long powerdown may be required. This long powerdown requirement may be ensured by using a port on the security gateway controller that can detect the state of a slow charge capacitor circuit to ensure that the system has been powerdown for a long enough period to be adequately discharged. This is done to ensure that all RAM has been cleared so no virus or "monitoring" virus can be lurking in the background. Alternatively, the security controller can pass an initialization program to the CPU that would instruct the CPU to clear all RAM addresses, or in some configurations the security controller may be configured to directly write to RAM itself. While the system is powered down, the MASTER TOKEN would be loaded into the token reader. Upon power up, the security gateway would load it's own GATEWAY PROGRAM and extensions, if any, and immediately check to see if the MASTER TOKEN was in the token reader. If the MASTER TOKEN was detected and authenticated, the security gateway defers or aborts all other initialization procedures and prepares to run the GATEWAY PROGRAM upgrade subroutine. After confirming the user PIN associated with the MASTER TOKEN, the security gateway would allow a vendor supplied SHELL to be loaded into the secure area (sectors −10 to −20, in our example) from the designated input source. Alterations of the SHELL could be further restricted by requiring additional passwords or vendor supplied tokens and certificates of authority. Failed attempts to enter the proper tokens or passwords could be monitored to limit the number of attempts, provide delays between attempts, and reported to report attempted security breeches. It would be possible, and perhaps preferable, for the manufacturer of the security gateway to publish interface standards for the GATEWAY PROGRAM for developers of security SHELLS. This would invite competition and creativity in the development of ever better and less obtrusive security SHELLS. Software developers would, however, be unable to sell their new SHELLS to the public until their programs had been accepted by the manufacturer and a license fee collected. At that point the manufacturer would issue the new SHELL a Digital Certificate and use SG.0R to encrypt a software upgrade token. Without this SG.0R software upgrade token, security gateway's would block any attempts to delete or alter the existing SHELL. In essence, then, the communications protocol between the CPU SECURITY PROGRAM in a SHELL and the GATEWAY PROGRAM can essentially be public knowledge. Security is maintained by the manufacture's control of the SG.0R. Prior to approval of a new SHELL and licensing, the manufacturer could provide developers with a unsecured non-consumer version of the security gateway that would freely accept any software changes for the purpose of testing and evaluation.

When a SHELL upgrade has taken place, the security gateway can be reprogrammed to accept future upgrades only after the use of an additional upgrade token from the software vendor that has provided the present SHELL. It would even be possible, with the agreement of the software developers and the security gateway manufacturer, to transfer future authorizations to the software developer or another third party.

Changing Security Parameters

Assume that by using the MASTER TOKEN to enter the GATEWAY PROGRAM upgrade subroutine as described above, the authorized user would be presented with three menu options: UPGRADE, TABLE MODIFICATION, and NORMAL OPERATION. The UPGRADE option would be selected to install new extensions to the GATEWAY PROGRAM or to install or upgrade a CPU SECURITY PROGRAM or SHELL. By selecting TABLE MODIFICATION menu, the user could change passwords, redefine restrictions on directories and files for particular users or user groups, and define other security programs that would be allowed to alter the basic SHELL. These security parameters might include both those enforced by the security gateway and all or part of those enforced by the CPU SECURITY PROGRAM. By selecting the NORMAL OPERATION menu option, the user would exit the security upgrade subroutine and the computer initialization would resume as normal with both the GATEWAY PROGRAM and SHELL, if any, in operation. Under normal operation the CPU SECURITY PROGRAM would be allowed to read its own restricted access tables (which might lie in sector −12, for example) but it would not be allowed to alter them. Additional tables that must be more dynamically accessible to the CPU SECURITY PROGRAM for update and alteration could be stored in other areas of the hard drive and would be protected by methods described elsewhere.

Additional Security Enhancements Made Possible by the Interaction of the Security Gateway and a CPU Based Security Program Essentially, what this method does is to create a peer to peer relationship between the CPU and the security gateway. The CPU cannot demand information, but can only request what the security gateway allows. In addition, because the security gateway's program and security parameters can be modified under carefully controlled conditions, the security software developers will continue to develop new and customized ways of meeting the security needs of individuals and corporations. Indeed, the security gateway can be programmed to act as an independent "watchdog" over the CPU SECURITY PROGRAM. In other words, read and write access to the hard drive can be allowed only when the security gateway has verified that the memory resident CPU SECURITY PROGRAM is active and intact. Whenever the CPU SECURITY PROGRAM, which would include many security features itself, is not running or is under threat of being corrupted, the security gateway's GATEWAY PROGRAM would independently restrict access to peripherals or force a computer shutdown or reboot to restore the CPU SECURITY PROGRAM.

Additional peer to peer interactions can be developed to enhance the system's security. For example, the security SHELL, which consists of a CPU SECURITY PROGRAM and extensions to the security gateway GATEWAY PROGRAM could involve an elaborate scheme of checks and double checks that serve to constantly check and verify the security system's integrity.

For example, when the security SHELL is first installed, a checksum of the CPU SECURITY PROGRAM could be stored in the security gateway's independent non-volatile memory. Thereafter, whenever the computer was booted up, the Security gateway would check the CPU SECURITY PROGRAM'S checksum and compare it to the stored value before allowing it, or any other programs in the startup menu, to be installed. Furthermore, when the CPU SECURITY PROGRAM is first installed at SETUP, the Security gateway could generate a random number (seed number from date, time, and available hard drive space) which could then be stored as the one and only SYSTEM ACCESS number. This number would stored in the security gateway's nonvolatile memory or restricted portion of the hard drive. Only factory test equipment could clear this number. This SYSTEM ACCESS number would then passed out to the CPU SECURITY PROGRAM, which would alter itself to incorporate this number at one or more places in the body of the key files of the CPU SECURITY PROGRAM. A new unique checksum would then be calculated for the altered CPU SECURITY PROGRAM and stored in security gateway non-volatile memory. At this point the installation procedure would then be complete and the CPU SECURITY PROGRAM would be uniquely identified and "married" to the Security gateway. Thereafter, whenever a reboot occurred, the security gateway would calculate the checksum of the CPU SECURITY PROGRAM as it is read from the hard drive and verify it against the pre-stored value to confirm the integrity of the program before allowing the system to continue with its normal operation.

As an additional layer of security, prior to allowing any writes, the security gateway could require that the CPU SECURITY PROGRAM provide it with both the SYSTEM ACCESS password and PSEUDO-RANDOM PASSWORD which is regenerated at each request. This PSEUDO-RANDOM PASSWORD would be identically calculated by both the Security gateway and CPU SECURITY PROGRAM (sharing the same algorithm which can be made unique to the system by using the SYSTEM ACCESS password as part of the calculation). The SEED at which each of the PSEUDO-RANDOM PASSWORD generators would begin their calculations would be generated by the security gateway and passed out to the CPU SECURITY PROGRAM periodically, or on each reboot of the system. These internally generated passwords would serve two functions. First, they would ensure that any program seeking access to the hard drive was passing these requests through the CPU SECURITY PROGRAM which is where the passwords are added to the command strings. Second, the use of an ever changing password sequence would make it more difficult for a "spy" virus to intercept the passwords. If the algorithm is made unique for each system, it would be even more difficult for the "spy" to attempt to break the algorithm.

Finally, the security gateway can be a "watchdog" over the passwords themselves. In this scheme the CPU SECURITY PROGRAM would store the passwords, and a critical portion of its own code, in RAM addresses that are monitored by the Security gateway. To ensure that only the working CPU SECURITY PROGRAM is accessing these passwords, the security gateway would monitor the CPU's RAM accesses to ensure that critical sections of the CPU SECURITY PROGRAM are run in proper sequence prior to the password access. The location of the CPU SECURITY PROGRAM in RAM would be pre-defined, or would be passed out to the Security gateway during the initialization of the SHELL and stored in security gateway secured memory location. Through this method, the security gateway would always know what memory locations should be watched before the passwords are even accessed. If another program attempted to read these sections of RAM tagged as critical to security, the security gateway could then flag the intrusion, sound an alarm, or even disable further access to the drive. This same technique can be used to monitor the bootup process. In this latter case, the security gateway would store in a secured memory location a record of the sequence of events which must occur on the BUS during a valid bootup. Any variation from this predefined sequence would generate an appropriate security violation alarm.

Still another level of security can be attained by providing for the CPU SECURITY PROGRAM to optionally transmit a special command to the Security gateway which essentially says, "I'm suspicious. I think my process have been or are about to be corrupted. Force a shut down until the next reboot." After receiving this command, the Security gateway would irrevocably lock out the hard drive, sound the alarm, and respond only to an U.0 token. For diagnostic purposes, the security gateway would save information about these and subsequent security breeches a secured memory location that can be read or cleared only with the validated U.0 token.

These examples demonstrate how the use of two independent processors, the CPU and the security gateway, simultaneously running their own independent security programs, can be utilized to substantially enhance computer security. Additional permutations and techniques can easily be devised with various levels of complexity and would fall within the scope of this invention.

Token Access at Multiple Sites in a Network

In many applications, it may be desirable to have a single token work at multiple computer stations. In this context, the token may be likened to a key chain, containing the keys to multiple computers. This end can be achieved in one of several ways.

First, the user can be registered at each individual workstation with each security controller generating a different U.XR key secured to be readable only by each security controllers own SG.XR key. The user could elect to use the same PIN at each site. If the token is a diskette, there would be sufficient memory space to stork a large number of keys. Second, if the workstations are networked together the public keys of each security gateway, SG.XB, can be securely transmitted to all of the other security gateways. At the time the token is created, the supervisor issuing the token could designate which terminals the user would have access to and the security gateway at the issuing computer would use the published SG.XB keys of the designated computers to create separate key files encrypted using each designated computer's SG.XB with each file containing U.XR, the PIN, and any other necessary information. The user's file for each designated computer could be stored under a file name using a portion of designated sites security gateway's public key, or some other site identifying tag, thus making it easy for the security gateway to identify the appropriate file. The user could then use the token at any of the designated computers. The security gateway at each site would merely need to search the token for the appropriate file that can be decoded with it's own SG.XR.

Third, the method described above could be further enhanced by adding an additional encryption level using SG.1R. In this case, for each site where U.X shall be allowed access through use of the token, U.XR is encrypted with SG.XB which is encrypted with SG.1R, where SG.1 is the issuing computer. This "key ring" method provide a means by which the other security gateways can verify that the token was indeed created at an authorized site in the network. When using the token at another host computer #5, for example, security gateway #5 would examine the key for a designator identifying where the token claims to have been created. Security gateway #5 would then examine network files to find the published key SG.1B and examine the token for a key file authorizing it to be used at host computer #5. This file would be decrypted using SG.1B. If it decrypts properly, security gateway #5 has confirmed that this file was created at security gateway #1 has therefore been created under controlled and secure procedures. But the users file is further secured by use of SG.5B which security gateway #5 can decrypt using its own SG.5R. This last step releases U.XR and the PIN for use by the security gateway at host computer #5.

Fourth, the security gateway at the network server can be used as a central clearing house for all user logon processes. In this case, all the security gateways would be configured in a manner that would allow the security gateway processors to communicate over the network, preferably in a manner that is independent of the CPUs. In this scheme, each SG.XR would be registered with the host computer. This would be most securely accomplished encrypting SG.XR with the CS.1B and then again with SG.XB. As described above, the server could confirm which security gateway in the network that the packet came from and only the server security gateway could decrypt SG.XR by using CS.1R. With all the private keys collected at the security gateway of the central server, tokens could then be created simply by using SG.1B. A token used at host computer #5 would be identified as created at host computer #1. The SG.1B encrypted file would be encrypted with SG.5R and sent to the central server. Since the central server security gateway alone has both SG.5B and SG.1R available in its restricted memory, it can retrieve the file that provides access to U.XR and the users PIN and other information. This file would then be encrypted with SG.5B then again with CS.1R. This file would then be transmitted back to security gateway #5 where its authenticity would be verified by decrypting first with CS.1B and then with SG.5R. In this way, security gateway #5 would be able to retrieve U.XR and other associated information. This process could be repeated every time the token is used at host computer #5. Alternatively, security gateway #5 could, at this point, add its own copy of the user files to the token by encrypting them with U.5B in the usual manner. In this way, the "key chain" would automatically have new keys added for each site immediately after its first use at each site.

Other Network Applications

In a network application this invention makes it easy and intuitive to establish a security hierarchy. For example, the highest ranking security officer on the network, the Corporate Security Officer, might issue user tokens to each department head paying particular attention to segregation of files and memory allocations so that problems or security breeches that might occur in one department do not spill over into other departments. Each manager under the department heads would receive a token with rights no greater than the Department Head and most probably with additional restrictions.

Tokens would not necessarily all be created by the Corporate Security Officer. Department Heads and their managers could also generate tokens for each user of a workstation in their department. New tokens would always be limited in rights to within the bounds of issuing parties own allowed limits. For example, a receptionist in the bookkeeping department with 100 megabytes of hard drive space allocated for her word processing files could create a temporary token for a summer intern granting 20 megabytes of her space to the intern.

Similarly, managers below the level of the Corporate Security Officer might be allowed the privilege not only of granting rights within the boundaries of their own limits, but also withdrawing rights. For example, if the head of accounting USER 1 discovered that his subordinate, USER 6, was embezzling, USER 1 could immediately remove USER 6's access rights to the system. This security measure could be taken even if the Corporate Security Manager was unavailable.

Typically, the MASTER KEYS for all computers in the network would be held in the custody of the highest ranking Corporate Security Officer. While department heads and lower security officers might be allowed to expand or restrict the rights of particular users or sites in the network, only the Corporate Security Officer, as holder of the MASTER KEYS, would be able to change, upgrade, or expand the security SHELL program or GATEWAY PROGRAMS used in the network.

As will be detailed below, the MASTER KEYS held in the custody of the Corporate Security Officer can be gathered into a MASTER KEY TABLE to automate security changes, with this MASTER KEY TABLE secured by use of a single SYSTEM MASTER KEY. In this way, virtually any security changes in the network can be implemented remotely from the Corporate Security Officer's terminal or any other predetermined sites. To further secure the SYSTEM MASTER KEY and the MASTER KEY TABLE for all the security gateways in the system, it would be possible and advisable to divide the SYSTEM MASTER KEY into several parts that would be placed in escrow with two or more trusted corporate officials. These escrowed keys would be useless until they are used in combination with each other so that the security gateway implementing the system wide changes can reconstruct the actual SYSTEM MASTER KEY and verify the PINS of each escrowed portion. For the sake of convenience, however, the following example will assume that there is a single Corporate Security Officer in whose custody all MASTER KEYS are intrusted. It will also be assumed below that the Corporate Security Officer will also initiate any security changes on the network from the central server for the network, thereby using the central server's security gateway key CS.1. In fact, any terminal could be used as long as it's public key was "published" to the rest of the network as a security gateway site that was authorized to make security changes.

In the present example, the Corporate Security Officer would initialize each new security gateway and collect the MASTER KEY. A GATEWAY PROGRAM subroutine would be run to provide any required parts of SG.1 and U.0, as determined by the SHELL software vendor, to a network table containing this information for all secured computers in the network with said table stored in a restricted memory location that is accessible only by use of the SYSTEM MASTER KEY. In this example, let us assume that this MASTER KEY TABLE is stored on the central server and the SYSTEM MASTER KEY is encrypted with CS.1B which is why the Corporate Security Officer can only use it at that site. If desired, it would be possible to accessing this MASTER SECURITY TABLE using the SYSTEM MASTER KEY from a remote site using a technique similar to that already described in option four of the section entitled "Token Access at Multiple Sites in a Network." In either case, the Corporate Security Officer would in this way be able to access a MASTER SECURITY TABLE, that is well protected in a secured gateway's restricted memory location, to automate security changes to a single site, multiple sites, or system wide. If for example, USER X is to be assigned new rights in the accounting department and have all rights removed in the purchasing department, the Corporate Security Officer could use the SYSTEM MASTER KEY to activate a SHELL subroutine that would identify all the computers that should be instructed to refuse access to Token U.X and also to notify all the computers that should now accept Token U.X. These network messages would be "signed and sealed" by encrypting the message first by use of each target computers SG.XB and secondly by use of CS.1R. The security gateway receiving the message packet could then confirm that the message came from the central server, using CS.1B, which is authorized to execute security changes, and then to read the private message using its own private key, SG.XR.

Most security changes involve either (1) expanding one or more rights of a user or (2) restricting one or more rights of a user or (3) changing or upgrading the security program used at a site or network wide. The last of these is always problematic and should always be strictly controlled. Changes in user or site rights, however, involve varying degrees of risk. When disgruntled employees or computer hackers restrict a users rights, this is generally very inconvenient but seldom provides an opportunity to cause great damage to corporate data. A far more serious problem is when a hacker manages to expand his rights so as to gain access to files that would normally be deprived to him which he can then steal, alter, or destroy. Conversely, when a Corporate Security Officer needs to expand the rights of an employee, delays in doing so can be inconvenient, but seldom damaging. But if the Corporate Security Officer needs to restrict the rights of an employee who, for example, is about to be fired or has made threats against the company, speed can be essential. This analysis suggests that network computer security might be enhanced by a process that delays and verifies the expansion of rights but never impedes the restriction of rights.

The security technique described above can be easily implemented by use of the security gateway disclosed in this invention. The network SHELL would be designed to allow the Corporate Security Officer or any holder of a token with a higher security rating, a department manager for example, to revoke any or all rights of a particular user or network site either on site or from a remote location. However, to expand the rights of a particular user or network site, the Corporate Security Officer, or other to authorized parties could only transmit a conditional upgrade of rights. On reception of this message, the local security gateway and SHELL would notify the user that a rights upgrade has been authorized. This upgrade of rights, however, would not become active until authorized by an approved authority at that site. This might be a department head, for example, who has been issued a separate SECURITY UPGRADE token. The security upgrade would be accepted by the security gateway only after the SECURITY UPGRADE token was placed into the token reader and authenticated by use of the appropriate PIN. In this manner, it would be impossible to remotely grant expanded rights to a terminal or user without the collaboration of an on site agent. If the department head, in this example, had not received notice of the security upgrade, policy would require him to check with the Corporate Security Officer before allowing the upgrade to be completed. The use of an onsite SECURITY UPGRADE token would be especially important if extensions or changes to the security SHELL are to be implemented.

Restricted Program Lists

A widely desired feature is the ability to restrict what programs can be run on a corporation's computer. The ability to restrict the use of unauthorized programs is important to prevent employees from introducing computer virus programs into the system and also to curtail the risk of costly copyright and licensing violations. Because the security gateway can easily be configured to restrict users activities, it would be a simple task to create a table of executable files that are allowed to be loaded onto the hard drive or otherwise executed by the CPU. Alternatively, a list can be made to exclude the installation or operation of popular programs that are frequently the target of illegal copying.

The program restriction subroutine can designed to be either very inflexible (absolutely no unauthorized programs) or safely flexible (unauthorized programs can only be run in special isolated parts of the drive, and will automatically be deleted on a periodic basis). On the inflexible side, authorized program names and checksums could be stored on the network, CPU accessible areas of the hard drive, or in restricted memory. User rights to these programs could be flagged and updated by the computer security officer. The Security gateway's own security shell would assist the CPU security shell in enforcing these restrictions. Alternatively, if the user is authorized to operate on a "safely flexible" system, the security gateway would reserve an isolated section of the drive for any non-corporate programs the user might wish to examine, test, or run. Any attempt to load an unauthorized program onto the system would automatically be routed to a safe zone, for example, virtual drive S. In this in example, whenever a user logged onto drive S, or sought to open any files or programs there, the Security gateway would immediately rescind access to all other portions of the hard drive that are related to corporate files and could force the host computer to disconnect from any networks to which it is connected until the system is powered down or otherwise resecured. Only the sectors apportioned to user's drive S would be readable or writable to the CPU. In this way, the user could load or run any private programs, games, or even known computer viruses without exposing any other parts of the system to corruption. This method allows corporate officials the luxury of using the computer for private purposes while maintaining a secure Security gateway enforced wall between corporate files and personal files.

In a similar way, new programs being developed by corporate programmers could be automatically restricted by the security gateway to a specific virtual drive or development site. This restriction could only be lifted by the computer security officer who has access to the MASTER TOKEN after the new software had been tested and approved for general use. This provision would severely limit a corporation's exposure to disgruntled employees who are skilled computer programmers.

Internet Activities

As more and more communications occur across networks, on the Internet, for example, security becomes increasingly difficult. The present invention is has numerous application in securing such Internet activities. For example, the security gateway could easily be programmed to limit disk and network access whenever a CPU is connected to the Internet. In this way, the security gateway would automatically quarantine and block any destructive Internet programs employing Java or ActiveX or similar cross platform applications by limiting their activities to a secured area of the computer system.

Just as the security gateway can be used to enforce a table of authorized programs, so also could it enforce a table of authorized Internet sites that a user would be allowed to visit. By means of the security gateway, for example, even computer savvy children could be prevented from entering Internet sites with inappropriate material. Similar CPU based programs already exist, but can be easily defeated simply by installing an unrestricted web browser.

Privacy, ID verification, and Traceability on the Internet

The Internet provides unique opportunities and problems for communications and commercial transactions. There are conflicting interests in terms of preserving the privacy of Internet user, verifying the identity of users, securing the integrity of financial transactions, and being able to track the identity of parties in the event of a criminal activity. The following process is illustrative of many techniques that could be employed to take advantage of the features offered by the security gateway to satisfy these conflicting needs.

The goal is to create the electronic equivalent of a "paper trail" of signed documents that under normal circumstances is concealed, ensuring privacy, but can be investigated and decoded with proper authorization, such as a court order or with permission of the transacting parties, to investigate a crime or verify disputed issues. Confidence in this "paper trail" is assured using the security gateway as an independent means for guaranteeing that a sending party is using a computer that is under the control of an authentic security gateway and licensed security SHELL. Because the receiver knows that an authentic security gateway is ensuring that the proper secure communications protocol is being followed, the receiver can know that a proper "paper trail" is being recorded which can be decoded in the event of fraud or criminal behavior. Indeed, when agreed to by the transacting parties, or when demanded by law, anonymous but traceable transactions can be easily accomplished. In the following discussion, this will be referred to as a CERTIFIED TRANSACTION.

The key to this technique is the ability to confirm that a communicating computer is indeed under the supervision of an authentic security gateway. This can be accomplished by the manufacturer embedding in each device a "public key" that is common to all of the security gateways in that line of products. In this example, it will be assumed that SG.0B is used, although there could be a different key used for this specific purpose. At the start of a CERTIFIED TRANSACTION, the security gateway would encrypt a SELF-IDENTIFYING MESSAGE, including, for example, its own serial number, the version of the GATEWAY PROGRAM and SHELL in use, and a copy of SG.1B, using SG.0B. This SELF-IDENTIFYING MESSAGE is sent over the Internet to the manufacturer using a proprietary protocol for added security and verification of identity. The manufacturer's host site uses SG.0R to decrypt the package, thereby confirming that the SELF-IDENTIFYING MESSAGE must have been encrypted by an authentic security gateway since only security gateways manufactured by the company have access to the SG.0B. The authenticity of the security gateway can be further confirmed by including in the SELF-IDENTIFYING MESSAGE, other security gateway embedded data, such as a serial number, and the fact that the proprietary communications protocol was properly used.

Included in the SELF-IDENTIFYING MESSAGE would be information about the user as stored on the token in use. Most ideally, this would be in the form of a Digital Certificate that can be used to identify of the token holder. If the sender is seeking to complete an anonymous but traceable transaction, the manufacturer would need to verify the authenticity of the Digital Certificate using the published public key of the certifying authority that had issued the certificate. This step could be skipped if the receiving party will be provided with an unsealed Digital Certificate in which case the receiving party will open and verify the Digital Certificate.

If the sender is seeking to send anonymous but traceable communication, the manufacturer would confirm the authenticity of the Digital Certificate and then reencrypt it using AK.1B, the public portion of a anonymous transaction key. AK.1R would be held in divided escrow form by two or more trusted authorities. A message packet would be attached to this packet confirming that the AK.1B encrypted Digital Certificate had been authenticated by the manufacturer and could be retrieved with proper authorization, such as a court order, by the parties holding AK.1R in escrow. If desired, a date and time stamp could also be added to this message packet, plus information about the GATEWAY PROGRAM and SHELL that is "refereeing" this transaction, and information about the authority that had issued the original Digital Certificate and how that authority was able to confirm the identity of the sender: birth certificate on file, photo on file, fingerprints on file, et cetera. This information would allow the receiver the opportunity to grade the quality of the Digital Certificate and to evaluate how much trust can be placed in the claim that the certifying authority has adequately verified the identity of the sender. This packet containing the AK.1B encrypted version of the original Digital Certificate and added information would then be encrypted again using CA.1R, the private portion of key pair used for certificates of authority issued by the manufacturer. This CA.1R packet will hereafter be referred to as a digital Certificate for An anonymous Party, or CAAP. Finally, the CAAP is encrypted with SG.1B, which was transmitted to the manufacturer as part of the SELF-IDENTIFYING MESSAGE, and transmitted back to the security gateway that initiated the transaction. The security gateway then uses SG.1R to retrieve the CAAP which can then be stored on the token or immediately transmitted over the Internet to the receiving party. Immediate transmission may be required in some secured transactions and could be verified by use of the date and time stamp information imbedded in the CAAP by the manufacturer. The receiver of the CAAP would then use publicly published CA.1B to confirm that the authenticity of the AK.1B encrypted identifying Digital Certificate had been independently verified by the manufacturer. If the CAAP is accepted by the receiver, the associate transaction would completed.

If the sender is not anonymous and is offering to allow the receiver to examine the token holder's Digital Certificate, AK.1B would not be used. The manufacturer might still include a date and time stamp and then reencrypt the Digital Certificate using CA.1R and transmit it back to the security gateway using SG.1B. Using SG.1R the security gateway would recover the Digital Certificate that now has the additional certification from the manufacturer that the holder of the certificate is using a computer that is using a security gateway.

Because the manufacturer is able to confirm the use of a security gateway and the version of the licenses SHELL and GATEWAY PROGRAM in use, parties in electronic transactions of information or financial assets can be assured that the transaction is properly governed by whatever protocols are mutually agreed upon. Because the security gateway is independent of the CPU, it cannot be altered or tampered with by computer programmers.

The above discussion assumes that the manufacturer of the security gateway would provide the clearinghouse for verification of security gateways and issue for issuing CAAPs or other certificates of authority. In practice, however, this responsibility could be transferred to a third party as designated by the manufacturer and/or the owner of the security gateway with appropriate token authorization from the manufacturer.

Finally, it should be noted once more that while the discussion above refers to encryption and decryption of messages using one or the other part of a key pair, it may be preferred in practice to encrypt the bulk of a message with another type of key, such as a block encryption key, which may provide speed or security enhancements. This other key would then be encrypted with the appropriate portion of the key pair to create a lockbox, as previously discussed. In this way, the entire message can only be decrypted with the appropriate key of the key pair first by opening the lockbox and then using the key in the lockbox to decrypt the rest of the message.

Non-duplicatable Tokens

As previously described, a simple floppy diskette can be used as a token. The information on the diskette is securely encrypted with SG.1B so that it is only readable by the security gateway that issued the token (except in network situations where, as previously described, where token sharing techniques are employed). The token is further secured by means of a user PIN and any other identifying information that may be collected and used for verification of the person's identity.

Still, when using a simple floppy diskette, it would be possible for an exact duplicate to be made. In some cases, this may be advantageous if the user wanted to keep a "spare key" in another location. On the other hand, it also provides an opportunity for an intruder who gains temporary access to the key to undetectably make a perfect copy of the key. The intruder would still need to gain access to the PIN and other information, if any, but his job would be half done.

There are two general ways to thwart the duplication of tokens. First, if security gateways are installed in all computers in system, the GATEWAY PROGRAM can recognize that the diskette which the user is asking to duplicate is a token, even if it is a token for another security gateway. The security gateway can be programmed by the manufacturer or a Corporate Security Officer either to (1) never duplicate a token diskette, or (2) only to duplicate a token diskette after confirmation of a duplication request by the token holder's PIN and other information and/or permission of a security officer or department manager using their tokens. Additionally, the security gateway might be programmed to not only refuse to make a duplicate of a TOKEN but also to report the attempt to copy the token to the network supervisor, to make a false copy that will set off an alarm when used, or to mark the stolen token so that the owner will be notified of the attempted copy attempt the next time it is used, or to even remove rights granted to the token holder, either temporarily or permanently.

As these security gateway technology becomes more common, the techniques described above, and similar techniques that will be obvious to those skilled in the security arts, will provide an effective means the security gateway technology itself will be able to block the unauthorized duplication of tokens.

The second alternative is to use a unique diskette format or media for tokens that cannot be duplicated by disk drives other than those controlled by a security gateway. While special formatting could be used, it is likely that a determined corporate spy could find a means to develop a device that could mimic the formatting method and read and write in that format. Perhaps the most secure option would be to create token media that is permanently marked or coded in a non-duplicatable manner.

There are many copy protection schemes that can be used to make diskettes which are uncopyable or at least extremely difficult to copy. One method involves laying down an analog track with a pattern of identifying bits (a "fingerprint") embedded in this track. If the drive heads consistently read this track the same way, then it is known that this track is a binary one and the diskette is rejected as a copy. Only if this track gives varying results, except for the embedded identifying bits, is the diskette assumed to be the original. If the identifying bits are unique for each diskette manufactured, then each diskette is essentially unique. This identifying information can be read by the security gateway and can be stored in the SG.1B encrypted files along with U.XR. Thereafter, whenever a token diskette is inserted into the drive, the security gateway would check the diskette's actual "fingerprint" and compares it to the copy of the fingerprint encrypted in the security file. If the diskette is a copy, the fingerprints will not match and the token would be rejected or the user could be channeled into a network security trap. It should be noted that standard copy protected diskette scheme described above proved vulnerable to hackers disassembling the CPU code and disabling the subroutine that went out to check for the analog track. In this application, however, because this code would be part of the GATEWAY PROGRAM stored in restricted memory, it would not be vulnerable to disassembling or alteration.

Other mechanical or chemical marking techniques might also be employed to create special diskettes that can be used as tokens wherein each token would have a unique "fingerprint." The diskette media might be precisely or randomly scarred with lasers, chemical spattering, ion bombardment, or other means. It would be sufficient to simply have a number of sites that either no magnetic charge or a fixed magnetic charge. When creating a new token, the security gateway could consecutively write and read all 0's and all 1's to the diskette and identify the unreadable or unchangeable bits which could then be used to describe the diskette's "fingerprint" pattern. As described above, a description of this fingerprint pattern can be encrypted with U.XR so that any other diskette containing the which did not match the fingerprint pattern would be rejected as a valid token.

Single Site Licensing of Software

Software developers and those who sell electronic information are constantly seeking for a better way to protect their products from being copied and distributed to other computers. Using the security subsystem's CONTROLLER and its own public/private keys, as previously described, it is possible to automate SINGLE SITE LICENSING (SSL) of software or data. In brief, software can be sold which would only operate on computers which have the SINGLE SITE LICENSING (SSL) protocol installed and operated by the security gateway. The requirement for use of an SSL enabled security gateway would be enforced by the use of licensed encryption key pairs issued by the manufacturer of the security gateway.

The security gateway is configured to recognize SSL licensed software by means of key pair that is provided in a restricted memory location either at the time of manufacture or during the upgrade or installation of a new GATEWAY PROGRAM. For this example, it can be assumed that the SG.0R is used by the manufacturer to encrypt a Digital Certificate that is provided to the licensed SSL software vendor for distribution with their products. Upon installation of the SSL licences software, the security gateway would use its embedded SG.0B key to verify that the SSL license is valid and execute the appropriate subroutines required to implement the SSL protocol for the new SSL program(s). This technique of verifying an SSL licenced product is similar to that used for verifying the right to upgrade the GATEWAY PROGRAM or SHELL.

In the following example of an SSL protocol, upon installation and initialization of an SSL protected program, the software would be "married" to the security gateway of the host computer. If the software is transferred to another computer, the other computer's security gateway will not have SG.1R and will therefore be unable to decrypt the file and the program would thereby be rendered useless on other systems.

A specific advantage of this technique is that backup copies of the software can easily be made, but they will only be useful when reloaded onto a computer in which the security gateway to which it was "married" is still active. This would be especially useful with tape drive backups of an entire hard drive. If there was a hard drive failure but the security gateway was intact, a new hard drive could be installed and all files restored and the SSL protected programs would immediately work without the requirement for new "marriage."

Protocols can also be developed to "divorce" software from a particular site so that it can be "remarried" to a different host computer. Similarly, a protocol can be implemented to transfer the software to another computer in the event the host computer or security gateway to which the software was "married" is destroyed or rendered inoperable. The following is illustrative of how the security gateway can be used in this fashion. Additional variations will be obvious to those skilled in the art.

Marriage Procedures

In this example of an SSL Protocol, the security gateway would examine a files prior to allowing CPU access to determine if the file has an internal tag identifying it as an SSL protected file. An SSL file can also be marked with a file code which tells the Security gateway that said file is available for use by the security gateway only and cannot be shared with the CPU nor can it be copied without alteration to another file or media. This tag can be likened to a "DO NOT SHARE" tag that would attached to the SSL certificate of authenticity.

SSL licensed software would come with a token containing a Digital Certificate identifying it as an SSL protected product. In this example, the Digital Certificate, hereinafter referred to as the SSL Certificate, would be initially have been encrypted with SG.0R.

The SSL certificate would include a complete "marriage" record for this specific copy of the software. The software could not be run until it was first "married" to the security gateway installed in the host computer on which it is to be run. At the first initialization of the software, the security gateway reads the SSL certificate using SG.0B to verify that the software is not presently "married" to another device. If the software is "unmarried" the security gateway modifies the SSL certificate to record its marriage including in the certificate any user ID information which may be provided for by the SSL Protocol for tracking down software theft as provided hereafter. The SSL certificate, or portions thereof, is thereupon encrypted with the Security gateway's public key, SG.1B, so that it can thereafter by decrypted only by the security gateway to which it has been married.

The SSL certificate may also contain the software vendor's public key which can be used by the Security gateway to decrypt essential sections of the file. At this point the software vendor may have the option of designating that these sections of the code, as identified in the SSL certificate, shall be reencrypted with the security gateway's public key, SG.B, during installation. Subsequently, only the Security gateway which is "married" to that copy of the software could decrypt these critical sections of code and pass them on to the CPU.

After the above initialization procedures, whenever the CPU attempts to access an SSL protected file, the Security gateway first reads the embedded SSL certificate to determine if the software is "married" to said security gateway. It not, it then determines if the software is "married" to another Security gateway and the "adulterous" CPU's is denied access to the requested files. If the certificate shows that the software is indeed "married" to said security gateway the Security gateway then checks its own DIVORCE FILES, which are located in restricted memory, to determine if the software has previously been "divorced" from the Security gateway, or, in other words, uninstalled so that it could be transferred to another computer site. If there is a history of divorce indicated, the files will not be read. In short, the CPU is allowed to read the SSL protected files only after their "marriage" to the Security gateway has been authenticated.

Divorce and Remarriage Procedures

At the vendor's option, a "divorce and remarriage" protocols could provide a means for uninstalling the SSL protected program from its original site so that it can be transferred to another computer with an SSL enabled security gateway. Using key pairs provided by the SSL protocol, the "divorcing" security gateway and "new spouse" gateway could communicate over a network or by the exchange of a token to confirm and verify that each party is an SSL enabled security gateway and to exchange their respective public passwords, SG.1B and SG.5B, for example. Upon obtaining SG.5B, the security gateway that was presently "married" to the software would use SG.5B to reencrypt the SSL certificate, including in the certificate a record of the prior "marriage" to SG.1 and transfer of the marriage to SG.5. Any SG.1B encrypted blocks in the software would also be reencrypted using SG.5B to enable the transfer or "remarriage."

The "divorcing" security gateway would also place a record of the divorce into a table in its own restricted memory. This is done to prevent an attempt to reload a backup copy of the "divorced" software onto the system. If this is attempted, the security gateway would recognize from the table that while it is able to read this copy of the software, it is not authorized to do so because of the divorce.

Similarly, it is now a common practice for trial copies of software to be available through the Internet. If a trial copy was SSL enabled, after the trial period was over the security controller would make a record in its restricted memory noting that this software has been tried for the allotted number of times or period of time. Subsequent attempts to uninstall the trial software and to reinstall it for a second trial period would be refused by the security gateway.

Death Certificate

In the unlikely event that the security gateway itself was damaged or destroyed, users might be allowed to return the token containing the SSL certificate to the vendor for issuance of a "virgin" copy. The Protocol, however, would provide that the returned token would contain a file created by the first security gateway which would include the user's registration information and the "dead" security gateway's public key, SG.1B. This public key would then be posted on an Internet morgue file. Purchases, registrations, and other transactions which require submission of the security gateway public key could then be checked against the morgue file. Any transactions by a security gateway previously reported as "dead" by a user could trigger withdrawal of privileges, investigation of fraud, and civil or criminal sanctions.

Electronic Purchases

The above procedures assume that SSL software is purchased on removable media, in which case the SSL certificate is already in place. When the software or data is transferred electronically, the SSL protocol can easily provide for the host security gateway to create an SSL certificate which would serve to control the marriage and divorce procedures as outlined above.

It is also noteworthy that in electronic transfers of software, the software or data vendor could request SG.1B, or a similar public key owned by the security gateway that is to be used for SSL transfers. Using this key, SG.1B, the vendor could then provide the files with the SSL certificate and any other encrypted blocks already encrypted with the SG.1B. In other words, if provided with the security gateway's public key in advance, the software vendor could complete the "marriage" even before the software is delivered to the buyer. This would be the most effective means for preventing unauthorized use of commercial software or data files.

Secure Cycling to New Keys

With sufficient computing power, it is possible to factor or "crack" a private key. Yet even if the network manager of a large corporation were to harness the parallel processing power of thousands of computers, the factoring of even a small key would take many months or even years. This lengthy period of time required to "crack" a key, even when one has immense computer resources, provides a safe zone during which a key pair can be considered safe. After a year or so, however, one must consider the possibility that critical key pairs, such as SG.0 and U.0R could be compromised.

However, since each security gateway is capable of generating its own SG.1 key pair, there is no reason it could not generate a new key pair every six-months, for example. If this were done, the complete history of previous keys would stored in a restricted area and/or backed-up using the latest SG.1B. Drawing on this historical record, security gateway could always decrypt files that had not previously been updated with the new SG.1B. In this way, previously encrypted files that were opened would automatically be re-keyed. Similarly, tokens U.0, U.1, and U.X, could also be automatically updated with the newest SG.1B and be issued new U.XR keys, at periodic intervals. A historical record of U.XR keys would be kept on the token in a file encrypted with the most recent SG.1B. Such periodic replacement of "old" keys with fresh ones can be done automatically by the CONTROLLER with out any involvement of the user. The user need not even be aware that it is taking place. The only cost would be a slight delay when the user accesses a secured file which is overdue for being be re-keyed.

Ramifications, Scope of Invention and Conclusion

The present invention increases the security options available to computer users by introducing a new level of control over the computer's access to its peripheral devices. In the prior art, computers have had a direct and unlimited control over their peripheral devices. The users control over the peripherals is implemented through a programs operating at the CPU level. But since a computer's CPU can come under the control of a malicious person or a computer virus, this unlimited access to the peripheral device places the authorized user's data and programs at risk of alteration or deletion.

The present invention overcomes this inherent weakness in the prior art by implementing another level of user control over the computer. This control occurs directly at the midpoint between the computer's CPU which operates programs, and the peripheral devices which are directed by the CPU to implement programs or retrieve and store data. Because the security gateway is independent of the CPU, this invention makes it impossible for any program run by the user to cross over into restricted memory areas to read, alter, or erase data. Thus, even a system programmer with extensive rights cannot bypass or alter the Security gateway's security program. Furthermore, as described in the previous disclosure, the Security gateway can protect the CPU's boot tracks, security shell, and even RAM tables reserved for the security shell.

While this invention provides an unbreechable barrier against security attacks initiated at the CPU level, it also retains flexibility, providing a means for security software designers to enhance and customize security SHELL to meet evolving consumer needs.

The method disclosed in this invention produces the following advantages:

it allows the user to temporarily make all or portions of a peripheral device completely inaccessible to the computer;

it allows the user to temporarily make all or portions of a peripheral device read-only;

it allow the user to temporarily make all or portions of a peripheral device write-once so that important data may not be accidentally erased or written over;

it allows the user to temporarily make all or portions of a peripheral device write-only so that sensitive data may not be read or copied except under authorized conditions.

it provides means for alerting the user of unauthorized attempts by the computer to access a secured peripheral device which may aid in the detection and elimination of computer viruses or other interlopers.

it provides a means for anonymous but traceable electronic transactions that offer both parties the assurance of traceability and the confidence that the their identities are protected unless there is a authorized investigation, such as by court order.

it provides a means for single site licensing of software to prevent the unauthorized use or duplication of intellectual property.

Although the description above contains many specifications and precise examples, these should not be construed as limiting the scope of the invention but merely provide illustrations of some of the principle ways in which the invention can be implemented. Once disclosed, customizing of this process to suit an individual client's security needs will be obvious to one skilled in the art.

Thus, the foregoing is considered as illustrative of the principles of the invention, but is not by any means exhaustive. Numerous modifications and changes will be obvious to those skilled in the art. Therefore, it is not desired to limit the invention to the exact construction and process shown and described herein, and accordingly, all modifications and equivalents which utilize a user accessible switch which limits a computer's access to its peripheral devices fall within the scope of this invention.

While preferred embodiments of the invention have been disclosed in detail, it should be understood by those skilled in the art that various other modifications may be made to the illustrated embodiments without departing from the scope of the invention as described in the specification and defined in the appended claims.

What I claim is:

1. A method for providing security for a computer comprised of a central processing unit, peripheral and file storage devices, at least one of which can be used as a token access device that can read and write files to removable storage media suitable for use as a token, a computer operating system, and a CPU independent security subsystem which includes a security control unit and programmable auxiliary memory, sad method comprising of the steps of:

(a) generating with said security control unit a security subsystem key pair comprised of a public key and a private key;

(b) storing said private key data in a memory location which is under the control of the said security subsystem;

(c) creating with said security -subsystem a key file encrypted with said public key and writing the key file to a master token by means of said token access device, such that said encrypted key file can only be decrypted and authenticated by the security subsystem using its corresponding private key;

(d) allowing access to said security subsystem after initial installation and setup by said computer operating system for installation and modification of security requirements only when said master token is placed into an appropriate file storage device and said encrypted key file has been authenticated by the security subsystem;

(e) denying file and peripheral device access requests by the central processing unit when the security requirements are not satisfied.

2. The method of claim 1 further including the steps of:

(f) creating with said security subsystem a special use token containing a special use file encrypted with said public key such that said special use file can only be decrypted and authenticated by the security subsystem using its corresponding private key and such that said special use file contains information that identifies specific access rights and security restrictions that are applicable to the user of said special use token;

(g) providing to said security subsystem by a given user a valid user identification immediately after said special use token has been authenticated by the security subsystem, indicating to the computer operating system only those files which are accessible to the given user of said special use token and whether read operations, write operations, and execute operations may be performed upon the accessible files, and denying access to users with invalid access criteria and refusing to write data to any of the files stored in the file storage devices when operations without valid access criteria have been attempted.

3. The method of claim 2 further including the steps of:

(h) generating with said security control unit a user specific key pair comprised of a user public key and a user private key which can be used for authentication, verification, and private communications by a given user;

(i) writing to said special use file a copy of said user private key which has been encrypted with the security subsystem's own public key; and (j) storing said user public key in at least on file stored on at least one other file storage devices.

4. The method of claim 2 further including the step of:
(h) requiring the security subsystem to access a central file which contains the public keys for the security subsystems of other computers and to make encrypted copies of the special use file using the public keys of the other security subsystems to which the user has been granted limited access and to store these encrypted files on the special use token, whereupon the special use token can be securely used on the other computers.

5. The method of claim 2 further including the steps of:
(h) connecting the computer to a computer network; and
(i) providing that the security subsystem's parameters can be changed by the network manager at a remote location only when a special use token with security authorization to allow this change has been placed into the local token access device and authenticated by the security subsystem.

6. The method of claim 2 further including the step of:
(h) requiring the security subsystem to record invalid attempts to enter user identification information on the token and to initiate additional security precautions if the number of invalid attempts exceeds a predefined limit.

7. The method of claim 1 further including the step of:
(f) requiring the removable media to be of a type which has fixed or unwritable domains by which the security subsystem can uniquely identify the diskette and record the identifying diskette information in the key file recorded on the diskette such that if the key file is copied to another diskette the security subsystem can determine that the key file does not reside on the same removable token on which it was originally placed and so can reject the non-original diskette as a copy.

8. A computer security system for a computer having a CPU, a common bus carrying control logic signals, address signals, and data signals, and a computer operating system which comprises:
(a) means for providing a CPU independent security subsystem comprised of a control unit, programmable memory, a security program and general security parameters;
(b) means for attaching said security subsystem and a plurality of peripheral devices and file storage devices, with at least one of said file storage devices capable of reading and writing to removable media which will be used as a token read/write device, to said common bus;
(c) means for said security subsystem to generate at least one pair of keys comprising a private key and a public key and storing sad pair of keys in a restricted memory location residing on at least one of said file storage devices under the control of said security subsystem;
(d) means for said security subsystem to encrypt at least one key file using said public key and to write said encrypted key file by means of said token read/write device to a token comprised of removable storage media;
(e) means for requiring said security subsystem to deny access requests by said CPU to said peripheral and storage devices whenever said access requests violate said general security parameters; and
(f) means for requiring said security subsystem to accept modifications of said general security parameters after initial installation and setup when said token is inserted into said token read/write device and said security subsystem has decrypted said encrypted key file using said private key and thereby verified the authenticity of said token.

9. The computer security system of claim 8 further including
(g) means of storing a copy of said security subsystems manufacturer's public key in a secure memory location of said security subsystem; and
(h) means for requiring said security subsystem to accept modifications of said security program when a master token containing an upgrade authorization file encrypted by said manufacturer's private key is inserted into said token read/write device and said security subsystem has decrypted said encrypted key file using said manufacturer's public key and thereby verified the authenticity of said upgrade authorization file.

10. The computer security system of claim 8 further including:
(g) means for said security subsystem to generate a special use key pair comprised of a special use public key and special use private key and to store said special use public key on at least one of said file storage devices;
(h) means for said security subsystem to create a special use security parameters file encrypted with said public key that contains at least a copy of said special use private key and to write by means of said token read/write device said special use security parameters file to a special use token; and
(i) means for said security subsystem to retrieve said special use security parameters file from said special use token when said special use token is inserted into said token read/write device and to limit access requests by said computer to said peripheral and storage devices for a period of time and under such conditions as provided by said security program and said special use security parameters.

11. The computer security system of claim 10 further including:
(k) means for obtaining a PIN assigned to a user authorized to use said special use token and storing said PIN in a PIN-file encrypted with said public key and storing said PIN-file on said special use token;
(l) means for said security subsystem to retrieve said PIN-file from said special use token when it is inserted into said token read/write device and retrieve a keyboard entry of the PIN as a means of verification of said specific users identity; and
(m) means for said security subsystem to utilize said special use security parameters only when said PIN matches the keyboard entered value and to otherwise utilize said general security parameters.

12. The computer security system of claim 8 further including:
(g) means for said security subsystem to monitor the integrity of a CPU security program and to force a computer reboot operation whenever said integrity check fails to satisfy said general security parameters.

13. The computer security system of claim 8 further including:
(g) means for said security subsystem to generate a seed number that is stored in a memory location accessible to a CPU security program run by said CPU and said operating system;
(h) means for said security subsystem and said CPU security program to use said seed number in identical random number generating routines to create a pseudo-random password; and (i) means for said security subsystem to require said CPU security program to supply said pseudo-random password at such time and under such conditions as required by said general security parameters and to activate security breech operations as defined for this case in said general security parameters when ever said pseudo-random password generated by said CPU does not match said pseudo-random password generated by said security subsystem.

14. The computer security system of claim 10 further including
   (n) means for said security subsystem to retrieve at least one other security subsystem's public key, where said other security subsystem is attached to another computer which is connected to said computer by a computer network; and
   (o) means for said security subsystem to create a copy of said special use security parameters file encrypted with said other security subsystem's public key and to store it on said special use token so the token can be securely used on said the other computer.

15. The computer security system of claim 10 further including
   (n) means for said security subsystem to transmit said public key to at least one other security subsystem is attached to another computer which is connected to said computer by a computer network;
   (o) means for said security subsystem to retrieve said other security subsystem's public key;
   (p) means for said security subsystem to encrypt a network security parameters change file first using said other security subsystem's public key and second with said private key and to transmit said network security parameters change file to said other security subsystem; and
   (q) means for said other security subsystem to implement the security provisions required by network security parameters change file after it has been successfully authenticated by decryption using first said public key and using second said other security subsystem's private key.

16. The computer security system of claim 8 further including
   (g) means for said security subsystem to store in said restricted memory a list of identifying characteristics of authorized programs that may be run by said CPU;
   (h) means for said security subsystem to restrict access to said authorized programs under such conditions as have been predefined in said security program. and said general security parameters.

17. The computer security system of claim 8 further including
   (g) means for said security subsystem to store a copy of a certified transaction public key in said restricted memory;
   (h) means for said security subsystem to encrypt a self-identifying message including a copy of said public key using said certified transaction public key;
   (i) means for transmitting said encrypted self-identifying message to the certifying authority who issued said certified transaction public key;
   (j) means for receiving from said certifying authority a unique digital certificate for an anonymous party private key encrypted with said public key;
   (k) means for said security subsystem to store said unique digital certificate in said restricted memory; and
   (l) means for said security subsystem to retrieve said unique digital certificate from said restricted memory and to transmit it to as required by said security program and general security parameters to other computers connected with said computer by means of a network.

18. The computer security system of claim 8 further including:
   (g) means for storing a copy of single site licensing public key in a secure memory location of said security subsystem; and
   (h) means for requiring said security subsystem to identify a new program to be installed on said computer that is subject to the single site licensing requirements defined in said security program by decrypting a digital certificate provided with said new program using said single site licensing public key and implementing said single site licensing requirements relative to said new program upon verification of said digital certificate.

19. The computer security system of claim 18 further including:
   (i) means for said security subsystem to extract from said digital certificate site license parameters defining at least one limitation on the use of said new program; and
   (j) means for requiring said security subsystem to deny requests by said computer to access said new program whenever said access requests violate said site license parameters.

20. The computer security system of claim 8 further including:
   (g) means for said security subsystem to transmit said public key to the software vendor of a site restricted program;
   (h) means for said security subsystem to receive a site license certificate encrypted with said public key from said software vendor;
   (i) means for said security subsystem to verify the authenticity of said site license certificate by decrypting said site licence certificate with said private key; and
   (j) means for requiring said security subsystem to deny requests by said computer to access said site restricted program whenever said site license certificate has not been received and verified.

21. The computer security system of claim 8 further including:
   (g) means for said security subsystem to create a special use identification file encrypted with said public key that contains at least a copy of a special use identification code and to write by means of said token read/write device said special use identification file to a special use token;
   (h) means for said security subsystem to store a copy of said special use identification code and special use security parameters assigned to said special use identification code in a restricted memory location; and
   (i) means for said security subsystem to retrieve said special use identification file from said special use token when said special use token is inserted into said token read/write device and to decrypt the file using said private key and to thereby retrieve said special use identification code and said special use security parameters and to limit access requests by said computer to said peripheral and storage devices for a period of time and under such conditions as provided by said security program and said special use security parameters.

22. The computer security system of claim 10 further including:

(j) means for said security subsystem to retrieve said special use private key from said special use token and to decrypt files that have been encrypted using said special use public key.

23. The computer security system of claim 10 further including:

(j) means for said security subsystem to retrieve said special use private key from said special use token and to encrypt files using said special use private key.

* * * * *